Jan. 2, 1968  R. R. HUSSEY ET AL  3,361,455
STEERING POST
Filed June 24, 1966
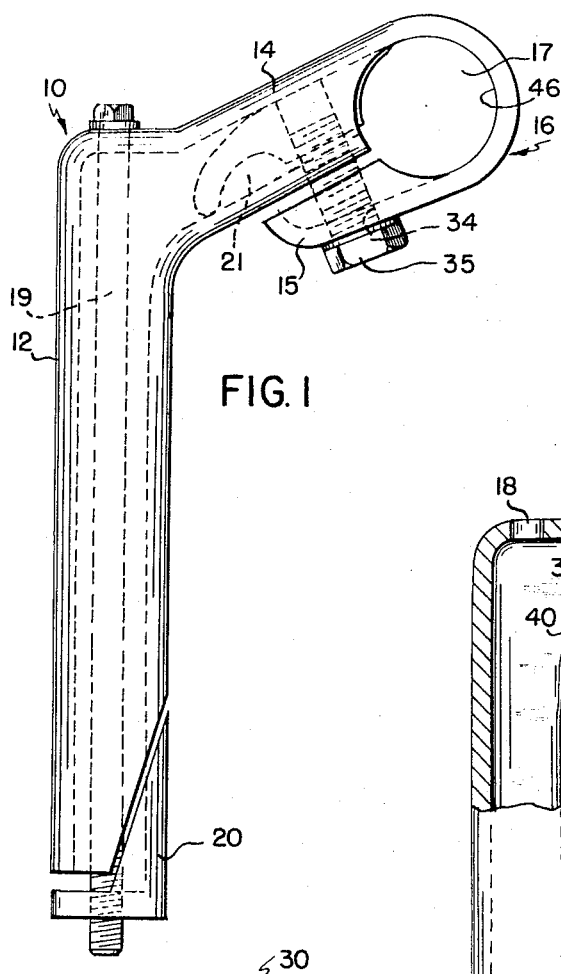
FIG. 1
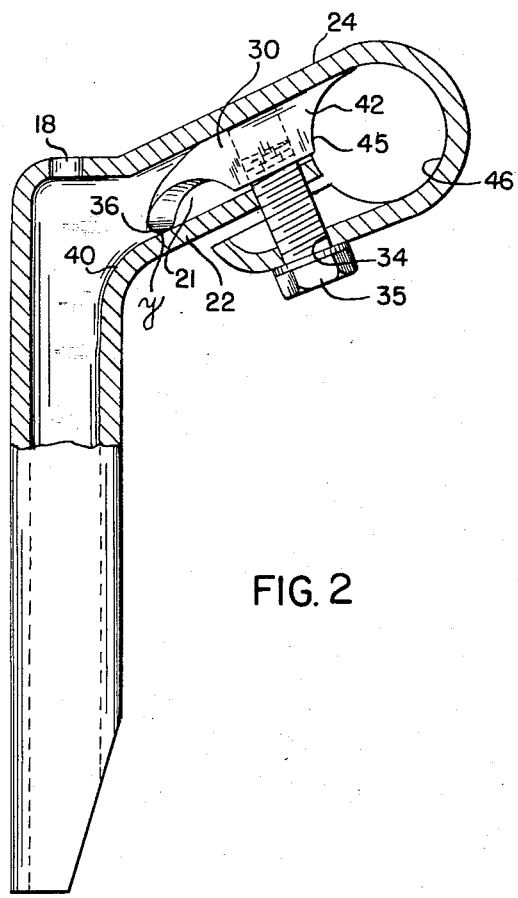
FIG. 2
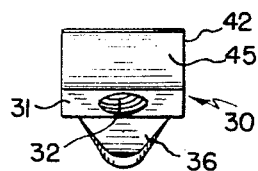
FIG. 3
FIG. 4
INVENTORS
ROBERT DICKINSON
ROBERT R. HUSSEY
BY
*Baldwin, Doran & Egan*
ATTORNEYS

United States Patent Office 3,361,455
Patented Jan. 2, 1968

3,361,455
STEERING POST
Robert R. Hussey and Robert Dickinson, Ashtabula, Ohio, assignors to The Ashtabula Bow Socket Company, Ashtabula, Ohio, a corporation of Ohio
Filed June 24, 1966, Ser. No. 560,168
3 Claims. (Cl. 287—52.02)

ABSTRACT OF THE DISCLOSURE

A steering post for securing a handlebar to a cycle or the like and which includes a hollow cylindrical stem that is insertable into the forked stem located at the forward end of the cycle, and a hollow generally cylindrical neck portion which has a clamping head formed on its free end and into which the handlebar is disposed.

A clamping lug which is loosely disposed in the clamping head is adapted to be brought into pressure engagement with the handlebar by means of a clamping bolt effective to tightly clamp the latter in said head.

---

This invention relates to cycle steering posts adapted for receiving cycle handlebars in clamping relation therewith and more particularly to a cycle steering post formed as a stamping and which includes a hollow cylindrical stem portion adapted to be held within an associated forked stem of the cycle, and a hollow cylindrical neck portion formed integral with the stem portion and extending upwardly and at an obtuse angle therefrom, said neck portion having an outer clamping head for receiving the cycle handlebar.

Heretofore, in cycle steering posts of this general type, as for example in the several post assemblies that are disclosed in U.S. Patents 2,487,661 and 2,505,648, the cycle bar is clamped in place by closing the clamping head through the use of a fastener such as a bolt or the like which is extended through an aperture formed in the top wall of the neck portion of the post and which bolt is then projected through a corresponding aperture formed in the clamping head. A nut or similar locking element is threaded into the bolt and when tightened forces the clamping head to its closed position. As will be realized, the neck portion of the steering post is subjected to substantial stress in its normal use inasmuch as the user of the cycle oftentimes bears down upon the handlebar whereupon the neck portion of the post has a tendency to bend under said stress.

As will be further realized, with an aperture formed in the top wall of the neck portion of the post, the effective cross-section thereof is correspondingly reduced thereby likewise lowering the strength properties or capacity of said neck portion. This is a very important limitation that must be considered in the commercial utilization of such a steering post, and particularly when the steering post is intended for use on adult cycles.

It is therefore a primary object of the present invention to provide a cycle steering post having substantially increased strength over that of prior structures.

Another object of the present invention is to provide a cycle steering post of substantially increased strength and which includes a neck portion of uninterrupted cross-section whereby to afford said post with greater load carrying capacity.

Another object of the present invention is to provide a cycle steering post which includes an elongated cylindrical stem part having a neck portion integrally formed on one end thereof, the neck portion, in turn, being formed with a clamping head for receiving a handlebar, and a clamping lug which is loosely disposed in said head and movable into clamping engagement with a handlebar placed therein.

Still another object is to provide a cycle steering post as just described and wherein the clamping lug is finger-like in configuration and provided with a threaded aperture for receiving a clamping bolt, said lug being swingable about its one end by tightening said bolt to clampingly engage the handlebar placed in said head.

Another object is to provide the clamping lug with a clamping surface corresponding to the exterior surface contour of the handlebar to thereby enable said lug to provide surface-to-surface engagement with said bar.

A further object of the invention is to provide a cycle steering post of the above type fabricated from a single sheet metal stamping.

A further object of the invention is to provide a cycle steering post of the above type that is simple in construction, inexpensive to manufacture, and highly effective in operation.

Other objects and advantages of the invention will be apparent from the following description taken in conjunction with the drawings wherein:

FIG. 1 is a side elevation of a steering post incorporating the concepts of the present invention;

FIG. 2 is a similar view in elevation with the exterior wall partially removed to show the interior assembly;

FIG. 3 is a plan view of the clamping lug used in the instant steering post; and FIG. 4 is an end view of the clamping lug looking in the direction of the arrow A in FIG. 3.

Referring to the drawings, there is shown a cycle steering post of the invention, formed of a one-piece sheet metal stamping as generally designated as 10, and including a hollow cylindrical stem or stem portion 12 adapted to be held within an associated forked stem of a cycle, and a hollow neck portion 14 formed integral with the stem 12 and extending outwardly at an obtuse angle therefrom. The neck portion 14 has an outer free end 15 bent back upon itself to define a handlebar clamping head 16 containing a handlebar receiving aperture 17. An aperture 18 is formed in the top wall of the post through which a suitable bolt 19 extends, the latter being threaded into a wedge-shaped locking element 20. Upon threading the bolt into locking element 20, the post stem may be securely locked in the usual manner within the cycle stem.

The neck portion 14 is generally tubular in cross-section, having opposed side walls 21, a bottom wall 22, and a top wall 24.

The steering post is fabricated as a one-piece stamping from a single sheet metal blank of generally elongated outline. The free end 15 is also preferably formed in a cupped structure to impart strength and resistance to deformation thereto. As thus formed, the clamping head 16 is seen to be generally circular in configuration to thereby accommodate a tubular handle bar within the aperture 17.

With the handle bar disposed with the aperture 17, it is secured therein in the following manner.

A clamping lug 30, as best seen in FIGS. 3 and 4, which is somewhat finger-like in configuration, is disposed within the interior of the tubular neck portion 14 of the steering post 10.

Said lug is formed with a rectangularly shaped center part 31 in which an internally threaded aperture 32 is fabricated.

The free end 15 of the neck 14 is provided with a hole 34 into which is passed the threaded shank of a suitable bolt 35, which shank is then adapted to be threaded into said lug aperture 32. The hole 34 is somewhat larger in diameter than bolt 35 to enable the shank of said bolt to be freely extended therethrough.

As best seen in FIG. 2, one end 36 of the lug 30 projects outwardly and downwardly from the rectangular mid-portion 31 and is intended to contact the inner surface 40 of the bottom wall 22.

The opposite end 42 of said lug is of greater width as compared to said one end, and is formed with an arcuate surface 45 extending across its face. The radius of the arcuate surface 45 is substantially the same as the radius of aperture 17 such that when the clamping lug 30 is assembled within the interior of the post as seen in FIG. 2, said surface 45 is intended to be a substantial continuation of the curved inner wall surface 46 of the free end 15 defining said aperture 17.

When the bolt 35 is threaded into the lug 30, said lug is drawn toward the bottom wall 22 of the neck portion 14 whereupon the curved end 36 of said lug engages the surface 40 of said wall at point Y. When this occurs, the lug moves or pivots about said contacting point Y in a clockwise direction as seen in FIG. 2 whereby the aforesaid arcuate surface 45 is swung into engagement with the exterior surface of the handlebar thereby peripherally clamping said bar between said lug and said inner wall surface 46. The loose fit between the hole 34 and bolt shank permits this movement to take place.

Having thus described a preferred embodiment of steering post defining the present invention it will now be realized that the same is susceptible to various modifications, combinations and arrangements of parts without departing from the inventive concepts thereof as are defined in the claims.

What is claimed is:

1. A steering post adapted to secure a handlebar to a cycle comprising a one-piece stamping formed from a single sheet metal blank and including a cylindrical stem portion adapted to be held within a corresponding stem receiving aperture of a cycle, a tubular neck portion formed integral with and extending outwardly from said neck portion, said neck portion having an outer free end reversibly bent upon itself to form a clamping head having a circular aperture to receive a handlebar, a clamping lug loosely disposed in said tubular neck portion and provided with a pivot portion at one end, and fastener means in said free end connecting with the other end of said lug for moving said lug into said aperture to clampingly engage said handlebar.

2. In a steering post as is defined in claim 1 and wherein the clamping lug is finger-like in configuration and has a downwardly curved end and which is pivotally movable within said neck portion about said curved end to bring the opposite end thereof into clamping engagement with the handlebar.

3. In a steering post as is defined in claim 2 and wherein the clamping lug is formed with a clamping surface similar in contour to the surface of the handlebar and engageable with the said bar to secure the same in said neck portion.

References Cited

UNITED STATES PATENTS

| | | | |
|---|---|---|---|
| 783,909 | 2/1905 | Swan | 287—52.02 |
| 2,280,662 | 4/1942 | Pawsat | 287—54.1 |

FOREIGN PATENTS

| | | |
|---|---|---|
| 422,520 | 6/1947 | Italy. |

CARL W. TOMLIN, *Primary Examiner.*

ANDREW V. KUNDRAT, *Assistant Examiner.*